Figure 1:
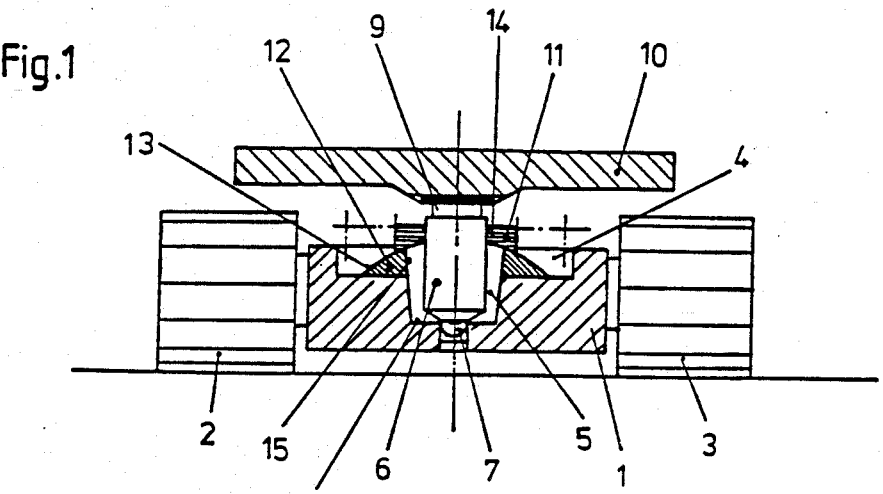

United States Patent [19]
Althoff

[11] Patent Number: 4,840,533
[45] Date of Patent: Jun. 20, 1989

[54] APPARATUS FOR TRANSPORTING LOADS

[75] Inventor: Karl-Heinz Althoff, Bad Oeynhausen, Fed. Rep. of Germany

[73] Assignee: O & K Orenstein & Koppel AG, Dortmund, Fed. Rep. of Germany

[21] Appl. No.: 112,510

[22] PCT Filed: Nov. 7, 1986

[86] PCT No.: PCT/EP86/00641
§ 371 Date: Aug. 24, 1987
§ 102(e) Date: Aug. 24, 1987

[87] PCT Pub. No.: WO87/03863
PCT Pub. Date: Jul. 2, 1987

[30] Foreign Application Priority Data
Dec. 24, 1985 [DE] Fed. Rep. of Germany ....... 3546106

[51] Int. Cl.$^4$ ............................................. B65G 41/00
[52] U.S. Cl. .................................... 414/495; 248/181; 414/590; 414/632
[58] Field of Search .............. 414/495, 632, 589, 590; 248/181

[56] References Cited

U.S. PATENT DOCUMENTS

| 673,262 | 4/1901 | Hine | 248/181 |
| 3,612,312 | 10/1971 | Behrmann | 414/495 X |
| 4,036,377 | 7/1977 | Weber | 414/495 |
| 4,157,876 | 6/1979 | Digiulio | 403/123 X |

FOREIGN PATENT DOCUMENTS

| 1101973 | 12/1956 | Fed. Rep. of Germany. | |
| 1634725 | 2/1974 | Fed. Rep. of Germany. | |
| 2416642 | 4/1981 | Fed. Rep. of Germany. | |
| 2539098 | 3/1983 | Fed. Rep. of Germany. | |
| 2099068 | 12/1982 | United Kingdom | 403/122 |

Primary Examiner—Frank E. Werner
Attorney, Agent, or Firm—Spencer & Frank

[57] ABSTRACT

An apparatus for transporting load units comprising: a drive system carrier for lifting the load unit; a single essentially vertically extending lifting element operatively associated with the drive system carrier; a lifting platform supported by the lifting element; and at least two variable length supporting elements provided between the drive system carrier and the lifting element so as to displace the lifting platform transverse to the lifting direction.

9 Claims, 1 Drawing Sheet

U.S. Patent

Jun. 20, 1989

4,840,533

APPARATUS FOR TRANSPORTING LOADS

The invention relates to an apparatus for transporting load units, particularly for relocating belt drive stations by means of a drive system. In order to lift the load, the drive system can be driven into a free space between the load and the ground and a lifting platform is raised until it lies against a load supporting face which forms the upper limit of the free space by means of at least one lifting element which extends essentially perpendicularly in the region of the drive system carrier.

German Pat. No. 2,416,642 and the associated German Patent of Document No. 2,539,098 already disclose devices for transporting a load unit, particularly for moving belt drive stations in surface mining operations. These devices are composed of a drive system which is moved into a free space of the load unit so as to lift the load unit. A lifting platform is provided with a plurality of lifting elements extending between the lifting platform and the drive system carrier. These lifting elements are arranged in such a manner that their center lines form the edges of a prism. By means of a centering body formed by a shaft stub, the lifting platform is rotatable with respect to the drive system carrier about a perpendicular axis disposed within the prism. This centering element is guided in the perpendicular direction so as to be displaceable and fixable with respect to a cylinder disposed within the drive system carrier. On the one hand, the lifting platform can be locked with the load unit and, on the other hand, is connected with the centering element by means of a ball bearing. In this structural configuration, the drive system moves into the free space, which customarily extends transversely to the load unit. By means of the lifting elements which are disposed approximately in the corner regions of the lifting platform, the latter is raised until it lies against the supporting face and is then locked to the load unit by means of clamps or the like. Then the pistons of the lifting cylinders are moved in so that the tracked vehicle is connected with the load unit only by the cylinder equipped with the shaft stub. Now the tracked vehicle can be turned about the longitudinal axis of the stub shaft in any desired direction of travel by moving the tracks in opposite directions.

The drawback noted here is that a plurality of working steps are required to bring the load unit into its direction of travel. Moreover, the orienting and raising functions are separated in a complicated manner and simultaneously involve a complicated structural configuration. Another drawback is that if the lifting platform is inclined due to the rigid lifting elements being raised to different heights, unintended forces are introduced into the lifting elements which result from the changing distances between the lifting elements (hypotenuse). Considered over a longer period of time, these unintentional forces lead to damages which, under certain circumstances, may cause the transporting means to prematurely malfunction. In contrast thereto, it is the object of the invention to provide a device of the stated type which realizes pivotability by way of a preferably not fixed, approximately perpendicular axis and an additionally possible displaceability of the lifting platform, preferably in all directions with respect to the drive system carrier. At the same time, the disadvantageous relative movements, as they occur in prior art devices, between lifting elements which are fixedly clamped to the drive system carrier and the lifting platform, are to be excluded.

This is accomplished by the invention by a rigid centered arrangement of a single lifting element in the region of the lifting platform and mounting of the lifting element so as to move in all directions with respect to the drive system carrier. At least two variable length supporting elements are provided between the drive system carrier and the lifting element for the displacement of the lifting platform in all directions with respect to the drive system carrier. The advantages with respect to the prior art are essentially that only a single lifting element is provided which performs the lifting function as well as the displacement of the lifting platform in all directions with respect to the drive system carrier. As before, the drive system moves into the free space of the load unit and—depending on the direction of travel—moves by rotating the tracks in opposite directions, or by path corrections, into approximately a centered position in the region of the free space. Actuation of the lifting element causes the lifting platform to lie against the supporting face. Possible displacements of the center of gravity can additionally be compensated by the lifting element, which is movable in all directions, in conjunction with the variable length supporting element so that the load unit rests on the lifting platform in an almost balanced state. The same occurs with changing, ascending or descending travel. No unintentional forces exist any longer which could damage components and the structural configuration is simplified compared to the prior art, thus also producing, not the least, savings in costs. The transfer of a portion of the load from the lifting platform to the drive system support is preferably effected by a support ring which is fixed to the lifting element when said lifting element is disposed at an angle to the vertical direction. In the region of the drive system carrier, the support ring has an essentially concave contour and cooperates in this region with a convex receiving element fixed to the drive system carrier. This contact region between the support ring and the receiving element forms a counterbearing spaced from the lifting element joint with which the lifting platform is displaced in all directions in that the corresponding faces of the support ring and of the receiving element slide on one another. Preferably the receiving element is given the outline, when seen in cross section, of a sphere segment. According to a further idea of the invention, the support ring has a different, preferably smaller, internal diameter than the receiving element. The receiving element is tapered in the form of a funnel in the direction of the drive system carrier, with the inner wall of the receiving element and the drive system carrier, respectively, forming abutment faces for the lifting element when the lifting platform is displaced. The slope of the lifting platform is thus determined by the difference in diameters between the support ring or, more precisely, the lifting element connected therewith and the receiving element. It is additionally proposed to provide at least two supporting elements to better absorb the transverse forces generated during transporting of loads or displacement of the lifting platform. Preferably, hydraulically actuated cylinders are employed as supporting elements, with the supporting elements extending between the support ring and the drive system carrier in such a manner that an acute angle is formed between the supporting elements. The supporting elements are mounted with respect to the drive system carrier and/or the support ring by way of joints which are movable in all directions to thus enhance the mobility of the lifting platform in all directions.

Figure 2:
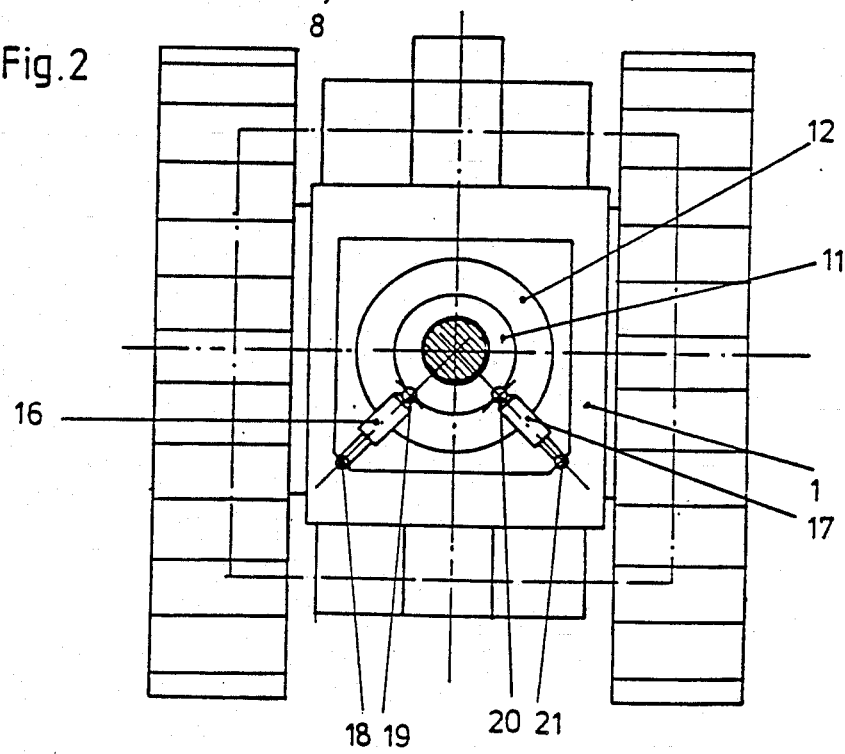

The invention is illustrated in the drawing and will be described below as follows. It is shown in:

FIGS. 1 and 2, various views of a device for transporting load units.

FIGS. 1 and 2 show a transporting device (load crawler) which can be used, in particular, to transport a belt drive station (not shown in detail). The transporting device is composed of a drive system carrier (1), to which two track laying gears (2, 3) are articulated. In the center region of drive system carrier (1) recesses (4, 5) are made. A lifting element (6) is disposed in the region of recesses (5) in such a manner that it is supported, by way of a joint (7) which is movable in all directions, in the lower region (8) of the drive system carrier (1). The lifting element (6) has the configuration of a hydraulic cylinder. A piston rod (9) is rigidly connected with a lifting platform (10) so that together with lifting element (6) it forms a unit which is pivotal in all directions about joint (7). To be able to securely manipulate the displacement of the lifting platform (10) in all directions and to ensure transfer of the load from the lifting platform (10) to the drive system carrier (1), a support ring (11) is provided which is fixed to the lifting element (6) and which slides on a receiving element (12) fixed to the drive system carrier (1). The receiving element (12) has a surface (13) in the form of a sphere segment which cooperates with a corresponding convex face (14) of the support ring (11). The inner walls (15) of the receiving element (12) and of recess (5) form abutment faces for the lifting element (6) which is pivotal together with the lifting platform (10). To ensure displacement of the lifting platform (10) and thus of the load unit (not shown in detail) in all directions, at least two variable length supporting elements (16, 17) are provided which form an acute angle and are connected, on the one hand, with the drive system carrier (1) and, on the other hand, with the support ring (11) by way of joints (18, 19, 20 and 21) which are movable in all directions. The supporting elements (16, 17) are configured as hydraulically actuatable hydraulic cylinders.

I claim:

1. An apparatus for transporting load units comprising:
   a drive system carrier for lifting the load unit;
   a single essentially vertically extending lifting element operatively associated with said drive system carrier;
   a lifting platform supported by said lifting element;
   at least two variable length supporting elements provided between said drive system carrier and said lifting element so as to displace said lifting platform transverse to the lifting direction; and
   an element having a tapered inner diameter and being attached to said drive system carrier, said tapered inner diameter being tapered toward said drive system carrier thereby forming an inner wall which acts as an abutment surface for said lifting element upon lateral displacement of said lifting platform.

2. An apparatus according to claim 1, further comprising a first joint which is attached between said lifting element and said drive system carrier; and a support ring fixed to said lifting element, whereby said support ring can transfer a portion of the load from said lifting platform to said drive system carrier when said lifting element is disposed at an angle to the vertical direction.

3. An apparatus according to claim 1, further comprising a support ring fixed to said lifting element having an essentially concave outline region on one surface thereof.

4. An apparatus according to claim 3, wherein said element attached to said drive system carrier includes a convex surface supporting said concave region of said support ring.

5. An apparatus according to claim 1, wherein said element attached to said drive system carrier includes a surface which has a spherically shaped outline.

6. An apparatus according to claim 1, further comprising a support ring having an inner diameter and being fixed to said lifting element and said element having an inner diameter at a location adjacent said drive system carrier which differs from said inner diameter of said support ring.

7. An apparatus according to claim 6, wherein said inner diameter of said element at the location adjacent said drive system carrier is larger than said inner diameter of said support ring.

8. An apparatus according to claim 1, wherein said variable length supporting elements are hydraulically actuatable.

9. An apparatus according to claim 1, further comprising a support ring fixed to said lifting element and wherein said variable length supporting elements extend between said support ring and said drive system carrier so that an acute angle is formed between said supporting elements.

* * * * *